Jan. 7, 1958
A. H. RALPH ET AL
2,818,626
HIGH STRENGTH FASTENING DEVICE
Filed Sept. 9, 1955
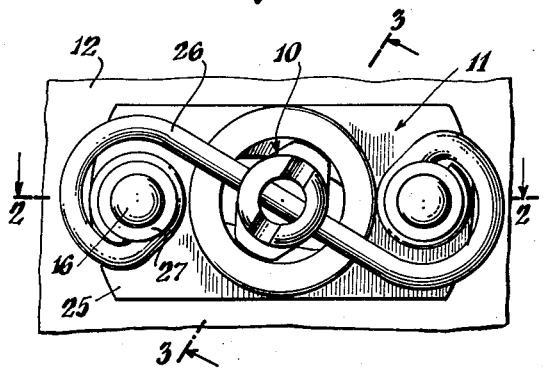
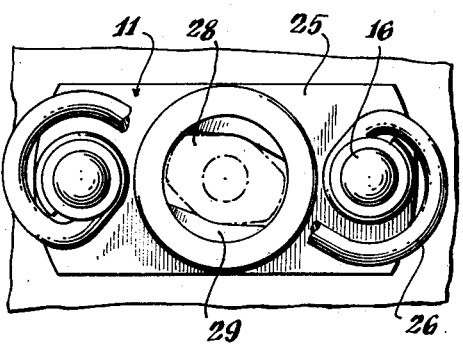
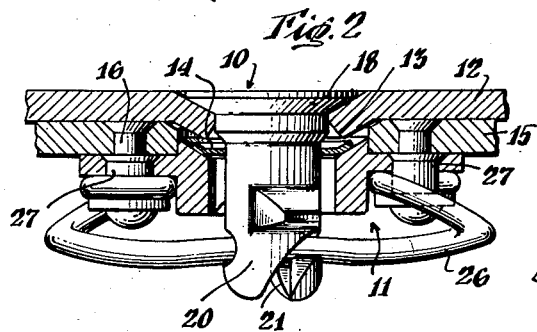
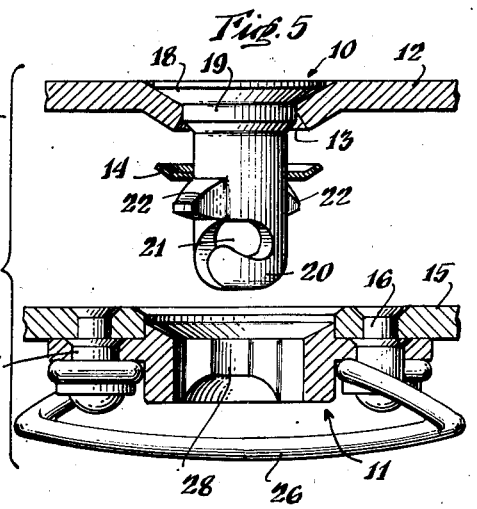
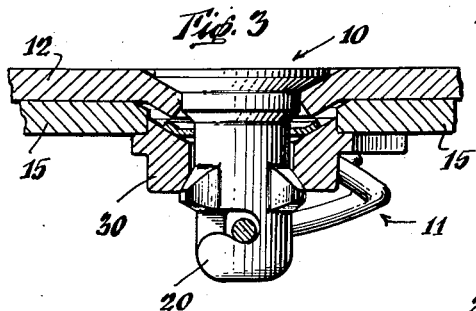
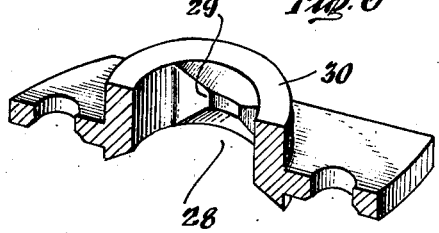
INVENTORS
Arthur Henry Ralph
Cyril William Langley
BY
ATTORNEYS United States Patent Office 2,818,626
Patented Jan. 7, 1958

2,818,626

HIGH STRENGTH FASTENING DEVICE

Arthur Henry Ralph and Cyril William Langley, Farnham, England, assignors to Dzus Fastener Co., Inc., Babylon, N. Y., a corporation of New York Application September 9, 1955, Serial No. 533,401

3 Claims. (Cl. 24—221)

This invention relates to a fastening device for releasably securing together two articles or parts and, more particularly, to a high strength fastening device.

Quick-acting fastening devices generally consist of a stud member and a receptacle member which are engageable upon rotation of one with respect to the other. The receptacle member generally embodies a spring, and when the stud and receptacle members are locked together, a slight separation or relative movement of the parts in the axial direction of the stud is possible due to the spring in the receptacle member.

It is an object of the present invention to provide an improved fastening device of the above type in which axial movement is limited or, if desired, is substantially eliminated.

A further object of the present invention is to provide an improved fastener of the above type having high strength both in shear and in tension.

Our invention contemplates the provision of a fastening device of the above type in which the stud and receptacle members not only have the usual interlocking fastening means but are also provided with rigid interengageable surfaces to limit or prevent relative axial movement between the members. The rigid interengageable surfaces preferably take the form of one or more laterally projecting lugs formed on the stud member which engage with cooperating surfaces formed on the receptacle member.

In the accompanying drawing,

Fig. 1 is a bottom plan view of a fastening device embodying our invention;

Fig. 2 is a central, longitudinal, sectional view in the direction of the arrows on line 2—2, Fig. 1;

Fig. 3 is a cross-sectional view in the direction of the arrows on the line 3—3 of Fig. 1;

Fig. 4 is a bottom plan view of the receptacle member alone, with the central portion of the spring omitted;

Fig. 5 is a central, longitudinal, sectional view of a fastening device embodying our invention showing the parts in unlocked and separated position; and Fig. 6 is a longitudinal, sectional view in perspective from the undersurface of the receptacle with the spring omitted therefrom.

Our invention is illustrated as embodied in a fastening device of the spiral cam type having a stud member illustrated generally at 10 and a receptacle member illustrated generally at 11.

The stud member is assembled with a removable cover plate or cowling 12 having a dimpled aperture 13 through which the stud extends and the stud is retained in place so that it may rotate with respect to the plate 12 by a suitable retainer such as the half grommet or washer 14.

Receptacle 11 is fixedly secured to sub-plate or support 15 in some suitable manner as by means of rivets 16. The sub-plate or support 15 has an aperture in alignment with the aperture in cover plate 12, and the stud 10 projects through the apertures in the two plates and may be interengaged with the receptacle upon rotation in a clockwise direction and may be released from such interengagement by rotation in a counterclockwise direction.

The stud member is of the spiral cam type and has a head portion 18, a neck portion 19 which engages with the sides of aperture 13 and a depending tubular shank portion 20 formed with the usual diametrically opposite spiral cam slots 21 which extend upwardly from the lower end of the stud and terminate in a locking portion. The spiral cam slots engage in a well-known manner with a cross bar or spring member formed on the receptacle and form the usual locking means in a fastener stud of this type.

In addition to the spiral cam slots, we also provide the stud with supplementary locking and retaining means in the form of the laterally projecting lugs 22. Any number of laterally projecting lugs may be provided and they are arranged to cooperate with complementary surfaces formed on the receptacle so as to resist relative axial movement between the parts when the fastener is locked. In the illustrated embodiment we provide two oppositely disposed lugs 22. The upper surface of the lugs 22, i. e. the surface which faces towards the head of the fastener stud, is preferably arcuate or curved in a radial direction so as to be slightly convex and is also disposed at an angle slanting downwardly towards the free end of the stud. The lugs may be arranged at any portion of the shank of the stud which will not interfer with the spiral cam slots and may conveniently be located in the position shown immediately above the upper ends of the slots.

The receptacle 11 comprises a supporting base or plate 25 having a fastener spring 26 made of suitable spring wire secured thereto as by means of the tubular retaining bushings 27. The spring is pre-assembled with the base member by means of the bushings, and the rivets 16 may be extended through the bushings to secure the receptacle to the support 15.

The spring 26 is one conventional type of spring used with spiral cam fasteners and includes a central cross-bar portion which is interengageable with the spiral cam slots 21 of the stud and is resiliently mounted at its opposite ends by means of the helical spiral coils through which the bushings 27 and rivets 16 extend. When the shank portion 20 of stud 10 is extended through aperture 28 in the receptacle and the stud is rotated in a clockwise direction, the spiral cam slots 21 will interengage with the locking bar portion of the spring, drawing it upwardly to the locked position, shown in Figs. 1, 2 and 3. When the stud is thereafter rotated in a counterclockwise direction, the locking bar portion of the spring will be released from the slots and the fastener will be unlocked.

Supplementary locking means engageable with the lugs 22 are also formed on the receptacle member. These may take the form of relatively rigid lug members 29 corresponding in number and relative spacing to the lugs 22 on the stud member. The lug members 29 project inwardly from and are rigidly mounted on the tubular collar 30 which projects downwardly from base plate 25 around the aperture 28. The undersurface of the lug members 29 correspond generally in shape and curvature to the upper surface of the lugs 22. When the fastener is locked, the lugs 22 are disposed in alignment with the lug members 29 and their surfaces are in confronting relationship either in direct engagement with each other or spaced only a short distance apart. If it is desired to prevent any separation between the parts that are fastened together, then the lugs and lug members are arranged so that their surfaces are in direct engagement with each other. If a slight separation may be permitted, then the lugs and lug members are arranged so their surfaces are spaced a short distance apart when the fastener is locked.

The radially curved and tapered surfaces on the lugs and lug members provide greater surface contact area and also serve to align and center the parts should there be slight misalignment.

The upper surface of the lugs 22 at the leading ends thereof, in the direction of rotation for locking the fastener (i. e. the left hand end as viewed from the top of the stud), is preferably slightly relieved so that it tapers downwardly. This permits the surface of the lugs 22 to provide a camming function when it engages the surfaces of the lug members 29 in locking the fastening device. In other words, should the thickness of the parts 12 and 15 exceed the permissible tolerances, the lugs 22 will not abut against and engage the side edge of the lug members 29 and the leading edge of the lug 22 will pass beneath the lower surface of the lug member 29 until the surfaces engage each other so that continued rotation thereafter performs a camming function placing the parts under stress in compression.

The lug members 29 are arranged in the same relative spaced relationship as the lugs 22. Since a pair of lugs 22 were provided in the illustrated embodiment, we also provide a pair of lug members 29 arranged in diametrically opposite relationship. As a result, the opening 28 is relatively elongated so as to permit the lugs 22 of the stud member to be inserted through the aperture when they are arranged so as to extend longitudinally thereof. When the stud is rotated a quarter turn to lock the fastener, then the lugs 22 will be arranged in confronting relationship to the lug members 29 as shown in Figure 1. When the stud is again rotated a quarter turn in a counterclockwise direction to unlock the fastener, it will be seen that the stud may again be withdrawn through the aperture 28.

It will thus be seen that when our fastening device is locked, the lugs 22 and lug members 29 prevent, or at least limit, relative axial movement between the parts depending upon whether the lugs and lug members are in direct contact with each other or are spaced slightly apart. In addition, since the fastening or retaining is accomplished not only by means of the spring 26 and the spiral cam slots but also by means of the interengagement between the lugs and lug members, our improved fastening device will be considerably stronger than fasteners of comparative size heretofore available. In addition, the distance between the outer ends of the lugs 22 may be substantially equal or only slightly smaller than the internal diameter of collar 30 so that the radial ends of the lugs 22 cooperate with the collar, as shown in Fig. 1, so as to limit or prevent relative lateral or shear movements between the parts.

From the foregoing, it will be seen that we have provided an approved fastening device of the quick-acting, self-locking type which is of simple construction but is nevertheless of high strength and arranged so as to limit relative movement between parts.

Modifications may be made in the illustrated and described embodiment of our invention without departing from the invention as set forth in the accompanying claims.

We claim:

1. In a quick-acting, self-locking fastening device having a stud member formed with a head portion, a shank portion and a spiral cam locking slot extending upwardly from the bottom of the shank portion and a receptacle member formed with a base portion having an aperture for receiving the shank of the stud member extending there-through with a resiliently mounted locking bar extending across the aperture and interengageable with the spiral cam slot when the stud member is rotated to locked position and which is released from engagement with the spiral cam slot when the stud member is counter-rotated to unlocked position, the improvement which comprises a pair of diametrically opposite laterally projecting lugs formed on the stud member above the spiral cam locking slot, said lugs presenting relatively broad upper surfaces which curve downwardly in the direction of their outer ends and a pair of cooperating rigid members formed on the base portion of the receptacle member and projecting into said aperture in diametrically opposite relationship, said rigid members presenting relatively broad lower surfaces which are curved in a manner complementary with the upper surfaces of the lugs and are interengageable therewith when the stud member is rotated to locked position so as to limit relative movement between the members.

2. In a quick-acting, self-locking fastening device having a stud member formed with a head portion, a shank portion and a spiral cam locking slot extending upwardly from the bottom of the shank portion and a receptacle member formed with a base portion having an aperture for receiving the shank of the stud member extending there-through with a resiliently mounted locking bar extending across the aperture and interengageable with the spiral cam slot when the stud member is rotated to locked position and which is released from engagement with the spiral cam slot when the stud member is counter-rotated to unlocked position, the improvement as set forth in claim 1 in which the leading edges of the lugs in the direction of rotation for locking the fastener are relieved to provide a camming surface for engaging the camming surface of the rigid members.

3. A quick-acting, self-locking fastening device comprising: a stud member formed with a head portion, a shank portion depending from the head portion, a spiral cam slot extending inwardly from the end of the shank portion and terminating in a locking portion and a pair of diametrically opposite laterally projecting lugs formed on the shank portion above the spiral cam slot, said lugs presenting relatively broad upper surfaces which curve downwardly in the direction of their outer ends; and a receptacle member formed with a base portion having an aperture for receiving the shank of the stud member extending there-through, a locking bar resiliently mounted on the base portion and extending transversely of the aperture, said locking bar being interengageable with the spiral cam slot of the stud member and a pair of cooperating rigid members formed on the base portion and projecting into said aperture in diametrically opposite relationship, said rigid members presenting relatively broad lower surfaces which are curved in a manner complementary with the upper surfaces of the lugs and are interengageable therewith.

References Cited in the file of this patent

UNITED STATES PATENTS

| 2,327,327 | Maynard | Aug. 17, 1943 |
| 2,506,953 | Dzus | May 9, 1950 |
| 2,610,378 | Powell | Sept. 16, 1952 |

FOREIGN PATENTS

| 596,697 | Great Britain | Jan. 8, 1948 |